United States Patent
Sink et al.

(10) Patent No.: US 11,007,757 B2
(45) Date of Patent: May 18, 2021

(54) LIGHT-WEIGHTING WITH DUAL RESINS IN A MULTI-LAYER BOTTLE

(71) Applicant: GRAHAM PACKAGING COMPANY, L.P., Lancaster, PA (US)

(72) Inventors: Marie Sink, York, PA (US); Yang Zhong, York, PA (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 252 days.

(21) Appl. No.: 16/355,207

(22) Filed: Mar. 15, 2019

(65) Prior Publication Data
US 2020/0290322 A1  Sep. 17, 2020

(51) Int. Cl.
| | | |
|---|---|---|
| *B32B 27/08* | (2006.01) | |
| *B32B 27/32* | (2006.01) | |
| *B32B 27/20* | (2006.01) | |
| B29K 23/00 | (2006.01) | |
| B29C 49/00 | (2006.01) | |
| B29C 51/00 | (2006.01) | |
| B29L 31/00 | (2006.01) | |

(52) U.S. Cl.
CPC ............ *B32B 27/08* (2013.01); *B32B 27/20* (2013.01); *B32B 27/32* (2013.01); *B29C 49/0005* (2013.01); *B29C 51/002* (2013.01); *B29K 2023/065* (2013.01); *B29L 2031/712* (2013.01); *B32B 2439/60* (2013.01)

(58) Field of Classification Search
CPC ......... B33B 27/08; B33B 27/32; B33B 27/20; B33B 2439/60; B29K 2023/065; B29C 49/0005; B29C 51/002; B29L 2031/712
See application file for complete search history.

(56) References Cited

U.S. PATENT DOCUMENTS

| | | | |
|---|---|---|---|
| 6,025,058 A | * | 2/2000 | Shepherd ................ B32B 27/32 428/215 |
| 7,153,127 B2 | | 12/2006 | Struble et al. |
| 2014/0271962 A1 | | 9/2014 | Rogaczewski |
| 2016/0115284 A1 | * | 4/2016 | Schwab ................ B32B 27/08 428/220 |

* cited by examiner

*Primary Examiner* — Michael C Miggins
(74) *Attorney, Agent, or Firm* — Stradley Ronon Stevens & Young, LLP (57) ABSTRACT

Molded multilayer polymer compositions and structures are provided, including a body portion having a body wall. The body wall has a first layer comprising a copolymer HDPE, a second layer comprising a homopolymer HDPE, and a third layer comprising a mix of the copolymer HDPE of the first layer and the homopolymer HDPE of the second layer, wherein the third layer is disposed between the first layer and the second layer, and a total weight content of the homopolymer HDPE is at least about 30 wt-% of the body wall. The body wall has an overall wall thickness T, the first thickness is about 10% of the overall wall thickness T, the second thickness is about 20% of the overall wall thickness T, and the third layer has a third thickness of about 70% of the overall wall thickness T.

40 Claims, 4 Drawing Sheets

| Homopolymer HDPE % | Inner layer | Middle layer | Outer layer |
|---|---|---|---|
| 0 (Control) | 100% 9503H | 85.7% inline regrind (regrind containing 25% PCR), 14.3 % PCR | 9503H + color |
| 30 | 100% 9503H | 47.6% inline regrind (regrind containing 25% PCR, 30% 6007), 23.8 % PCR, 28.6% 9503H | 6007 + color |
| 40 | 100% 9503H | 71.4% inline regrind (regrind containing 25% PCR, 40% 6007), 17.9 % PCR, 10.7% 9503H | 6007 + color |
| 50 | 100% 9503H | 85.7% inline regrind (regrind containing 25% PCR, 50% 6007), 14.3 % PCR | 6007 + color |

FIG. 4

| | Control 133 g | | Control 126 g | | Control 120 g | | 30% Homo HDPE 126g | | 30% Homo HDPE 120g | | 30% Homo HDPE 110g | |
|---|---|---|---|---|---|---|---|---|---|---|---|---|
| | Avg. | St. Dev | Avg. | St. Dev | Avg. | St. Dev | Avg. | St. Dev | Avg. | St. Dev | Avg. | St. Dev |
| T-avg. (in) | 2.689 | 0.004 | 2.679 | 0.002 | 2.682 | 0.001 | 2.678 | 0.001 | 2.675 | 0.001 | 2.685 | 0.001 |
| T-ovality (in) | 0.030 | 0.005 | 0.029 | 0.004 | 0.004 | 0.002 | 0.013 | 0.003 | 0.018 | 0.003 | 0.012 | 0.003 |
| E-avg. (in) | 2.580 | 0.002 | 2.571 | 0.002 | 2.573 | 0.001 | 2.569 | 0.001 | 2.566 | 0.001 | 2.574 | 0.001 |
| E-ovality (in) | 0.025 | 0.005 | 0.027 | 0.004 | 0.002 | 0.002 | 0.011 | 0.003 | 0.017 | 0.003 | 0.009 | 0.004 |
| E-wall thickness (in) | 0.051 | 0.005 | 0.055 | 0.004 | 0.055 | 0.004 | 0.053 | 0.005 | 0.058 | 0.005 | 0.052 | 0.005 |
| Overall Height (in) | 9.447 | 0.011 | 9.481 | 0.009 | 9.487 | 0.004 | 9.480 | 0.004 | 9.480 | 0.004 | 9.501 | 0.008 |
| Overall Width (in) | 7.365 | 0.024 | 7.394 | 0.007 | 7.443 | 0.005 | 7.467 | 0.007 | 7.416 | 0.003 | 7.435 | 0.003 |
| Overall Depth (in) | 5.430 | 0.007 | 5.433 | 0.009 | 5.410 | 0.009 | 5.423 | 0.009 | 5.429 | 0.011 | 5.414 | 0.008 |
| Weight (g) | 132.9 | 1.6 | 127.1 | 0.5 | 120.2 | 0.3 | 125.3 | 0.7 | 119.2 | 0.6 | 109.6 | 0.6 |
| Topload (lbs) | 82.2 | 5.5 | 78.9 | 1.8 | 63.6 | 1.3 | 79.8 | 1.8 | 69.5 | 1.1 | 65.8 | 1.5 |
| Drop impact (ft) | >10 | | >9.6 | | 7.1 | 0.7 | >9.6 | | 8.1 | 1.0 | 6.2 | 0.4 |
| 2' side drop (10 btls) | All pass | | All pass | | All pass | | All pass | | All pass | | All pass | |

| | 40% Homo HDPE 126g | | 40% Homo HDPE 120g | | 40% Homo HDPE 110g | | 50% Homo HDPE 126g | | 50% Homo HDPE 120g | | 50% Homo HDPE 110g | |
|---|---|---|---|---|---|---|---|---|---|---|---|---|
| | Avg. | St. Dev | Avg. | St. Dev | Avg. | St. Dev | Avg. | St. Dev | Avg. | St. Dev | Avg. | St. Dev |
| T-avg. (in) | 2.682 | 0.001 | 2.680 | 0.001 | 2.684 | 0.001 | 2.683 | 0.003 | 2.683 | 0.003 | 2.676 | 0.001 |
| T-ovality (in) | 0.021 | 0.002 | 0.017 | 0.009 | 0.003 | 0.002 | 0.010 | 0.002 | 0.010 | 0.002 | 0.018 | 0.004 |
| E-avg. (in) | 2.573 | 0.001 | 2.571 | 0.001 | 2.575 | 0.001 | 2.575 | 0.003 | 2.575 | 0.003 | 2.568 | 0.001 |
| E-ovality (in) | 0.019 | 0.002 | 0.016 | 0.009 | 0.002 | 0.001 | 0.007 | 0.003 | 0.006 | 0.003 | 0.015 | 0.005 |
| E-wall thickness (in) | 0.053 | 0.004 | 0.056 | 0.005 | 0.054 | 0.004 | 0.052 | 0.004 | 0.054 | 0.004 | 0.056 | 0.004 |
| Overall Height (in) | 9.493 | 0.003 | 9.506 | 0.005 | 9.508 | 0.005 | 9.508 | 0.005 | 9.507 | 0.005 | 9.509 | 0.002 |
| Overall Width (in) | 7.387 | 0.016 | 7.412 | 0.009 | 7.436 | 0.004 | 7.399 | 0.014 | 7.410 | 0.012 | 7.422 | 0.005 |
| Overall Depth (in) | 5.433 | 0.017 | 5.429 | 0.009 | 5.404 | 0.010 | 5.432 | 0.014 | 5.422 | 0.007 | 5.420 | 0.009 |
| Weight (g) | 127.2 | 0.5 | 119.3 | 0.4 | 109.3 | 0.5 | 125.9 | 1.3 | 121.2 | 1.7 | 110.7 | 0.3 |
| Topload (lbs) | 87.8 | 5.2 | 74.1 | 1.7 | 51.6 | 1.1 | 86.3 | 6.2 | 76.8 | 1.1 | 62.7 | 1.1 |
| Drop impact (ft) | >8.2 | | >9.5 | | 6.8 | 0.4 | >9.2 | | 7.4 | 0.6 | 5.5 | 1.0 |
| 2' side drop (10 btls) | All pass | | All pass | | All pass | | All pass | | All pass | | All pass | |

FIG. 5

LIGHT-WEIGHTING WITH DUAL RESINS IN A MULTI-LAYER BOTTLE

BACKGROUND OF THE DISCLOSED SUBJECT MATTER

Field of the Disclosed Subject Matter

The disclosed subject matter generally relates to multi-layer polymer compositions containing copolymer high density polyethylene (HDPE) and homopolymer HDPE. Particularly, the multilayer polymer compositions can be molded into a multilayer polymer article with improved weight, strength, impact resistance, and environmental stress cracking resistance (ESCR) properties.

Description of the Related Art

A wide range of products are manufactured from multi-layer polymer compositions into a finished article. Such products include containers for food, beverages, and various consumer products. A variety of methods and systems are also known for manufacturing multilayer polymer articles. For example, U.S. Pat. App. No. 2014/0271962, incorporated in its entirety by reference herein, discloses co-extrusion blow molding processes to transform multilayer polymer resin parisons into bottles or other like objects in a final blow mold.

Such polymer articles must have sufficient mechanical stiffness and strength during packaging, conveying, shipping, product filling, storage, and the shelf life of the consumer products contained therein. For example, the containers must generally be able to withstand pressure from different directions to avoid physical deformation. For example, a measurement of the topload can be used to characterize the mechanical strength and stiffness of a container.

Similarly, containers for consumer products should have sufficient impact resistance to withstand accidental falls, which may occur during handling. For example, a measurement of the mean drop failure height can be used as an indication of the impact resistance of a container.

Additionally, containers for consumer products should also have sufficient environmental stress cracking resistance (ESCR). ESCR is the premature cracking of a plastic due to simultaneous actions of stress and contact with chemicals. For example, a laundry detergent container must have sufficient ESCR to prevent cracking as a result of contact with surfactant in the laundry detergent, which a notorious stress cracking agent. Furthermore, containers can benefit from a lighter weight to reduce energy consumption during shipping and handling.

HDPE is a polymer resin commonly used in containers for food, beverages and consumer products. HDPE is synthesized from ethylene by coordination polymerization and has a density range as known in the art, for example between 0.924 g/cm$^3$ and 2.55 g/cm$^3$ ("Overview of materials for High Density Polyethylene (HDPE), Injection Molded," MatWeb.com). As embodied herein, the density of HDPE can be, for example, between about 0.941 g/cm$^3$ and about 0.960 g/cm$^3$ or greater, and the molecular weight range of HDPE can be between about $2\times10^5$ g/mol and about $3\times10^6$ g/mol. The homopolymer form of HDPE generally consists exclusively of the monomer ethylene and therefore has a linear molecular structure, high crystallinity, and higher density as known in the art, for example, greater than about 0.960 g/cm$^3$. As a result, homopolymer HDPE provides greater mechanical strength and stiffness. On the other hand, the copolymer form of HDPE comprises the ethylene monomer as well as other alpha olefins, and thus has more branches, a lower crystallinity, and a lower density as known in the art, for example, between about 0.941 g/cm$^3$ and about 0.959 g/cm$^3$. As a result, copolymer HDPE is more flexible and less rigid with more molecular entanglement, and provides good ESCR, leading to improved resistance to environmental stress cracking.

Polymer articles designed to hold food, beverages, or other consumer products typically require good ESCR properties to withstand stress cracking agents contained therein. However, containers formed only of copolymer HDPE possess poor mechanical strength (e.g., topload and impact resistance). While it would be advantageous to form an article with properties of both homopolymer HDPE and copolymer HDPE, melt-blending the two polymers does not provide synergistic properties (i.e., both good ESCR and good mechanical properties). On the other hand, bimodal resin technology can be used to combine homopolymer HDPE and copolymer HDPE to retain the advantageous properties of the two polymers but is very costly and not cost-effective for the high-volume production of consumer product articles.

There thus remains a continued need for articles possessing both good mechanically properties (e.g., topload and mean drop failure height) and good ESCR properties, as well as lighter weight, that can be formed without the use of costly processes such as bimodal resin technology. The presently disclosed subject matter satisfies these and other needs.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the compositions and methods particularly pointed out in the written description and claims hereof, as well as from the appended drawings.

To achieve these and other advantages and in accordance with the purpose of the disclosed subject matter, as embodied and broadly described, the disclosed subject matter includes a molded multilayer polymer structure comprising a body portion having a body wall, the body wall including a first layer comprising a copolymer HDPE, a second layer comprising a homopolymer HDPE, and a third layer comprising a mix of the copolymer HDPE of the first layer and the homopolymer HDPE of the second layer, wherein the third layer is disposed between the first layer and the second layer, and a total weight content of the homopolymer HDPE is at least about 30 wt-% of the body wall. Furthermore, the third layer of the molded multilayer polymer structure can include a regrind comprising the first layer and the second layer and an additional amount of the copolymer HDPE. The regrind of the third layer can further include a post-consumer resin (PCR) and an additional amount of the homopolymer HDPE. Additionally, with body wall having an overall wall thickness T, the first layer can have a first thickness of at least about 10% of the overall wall thickness T, and the second layer can have a second thickness of at least about 15% of the overall wall thickness T. For example, the first thickness can be about 10% of the overall wall thickness T, the second thickness can be about 20% of the overall wall thickness T, and the third layer can have a third thickness of about 70% of the overall wall thickness T. As embodied herein, the second layer can further comprise a colorant, and the copolymer HDPE can comprise ethylene and at least one other alpha olefin selected from butene, hexene and octene.

In accordance with another aspect of the disclosed subject matter, as embodied and broadly described, the disclosed subject matter includes a molded multilayer polymer structure comprising a body portion having a body wall, the body wall consisting of a first layer comprising a copolymer HDPE, a second layer comprising a homopolymer HDPE, and a third layer comprising a mix of the copolymer HDPE of the first layer and the homopolymer HDPE of the second layer, wherein the third layer is disposed between the first layer and the second layer, and a total weight content of the homopolymer HDPE is at least about 30 wt-% of the body wall.

In accordance with another aspect of the disclosed subject matter, as embodied and broadly described, the disclosed subject matter includes a molded multilayer polymer container comprising a body portion having a body wall defining a compartment, the body wall having an inner surface and an outer surface. The body wall includes a first layer disposed proximate the inner surface and comprising a copolymer HDPE, a second layer disposed proximate the outer surface and comprising a homopolymer HDPE, and a third layer disposed between the first layer and the second layer, wherein the third layer comprises a mix of the copolymer HDPE of the first layer and the homopolymer HDPE of the second layer, and a total weight content of the homopolymer HDPE is at least about 30 wt-% of the body wall. The third layer of the molded multilayer polymer container can include a regrind comprising the first layer and the second layer and an additional amount of the copolymer HDPE. The regrind of the third layer can further include a post-consumer resin (PCR) and an additional amount of the homopolymer HDPE. With the body wall having an overall wall thickness T, the first layer has a first thickness of at least about 10% of the overall wall thickness T, and the second layer has a second thickness of at least about 15% of the overall wall thickness T. For example, the first thickness can be about 10% of the overall wall thickness T, the second thickness can be about 20% of the overall wall thickness T, and the third layer can have a third thickness of about 70% of the overall wall thickness T. As embodied herein, the second layer can further comprise a colorant, and the copolymer HDPE can comprise ethylene and at least one other alpha olefin selected from butene, hexene and octene.

With reference to various embodiments of the disclosed subject matter, the total weight content of the homopolymer HDPE can be about 30 wt-% of the body wall, wherein the third layer comprises about 47.6 wt-% regrind, about 23.8 wt-% post-consumer resin (PCR), and about 28.6 wt-% copolymer HDPE, and the regrind comprises a mix of the first layer and the second layer, and an additional amount of about 30 wt-% homopolymer HDPE and an additional amount of about 25 wt-% PCR.

In accordance with another embodiment of the disclosed subject matter, a total weight content of the homopolymer HDPE is about 40 wt-% of the body wall, wherein the third layer comprises about 71.4 wt-% regrind, about 17.9 wt-% post-consumer resin (PCR), and about 10.7 wt-% copolymer HDPE, and the regrind comprises a mix of the first layer and the second layer and an additional amount of about 40 wt-% homopolymer HDPE and an additional amount of about 25 wt-% PCR.

In accordance with an additional embodiment of the disclosed subject matter, a total weight content of the homopolymer HDPE is about 50 wt-% of the body wall, wherein the third layer comprises about 85.7 wt-% regrind and about 14.3 wt-% post-consumer resin (PCR), and the regrind comprises a mix of the first layer and the second layer, and an additional amount of about 50 wt-% homopolymer HDPE and an additional amount of about 25 wt-% PCR. As embodied, the body wall has an overall wall thickness T and the first layer has a first thickness of about 5% of the overall wall thickness T.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the composition and methods of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

In accordance with the disclosed subject matter, a molded multilayer polymer structure is provided comprising a body portion having a body wall, the body wall including a first layer comprising a copolymer high-density polyethylene (HDPE), a second layer comprising a homopolymer HDPE, and a third layer comprising a mix of the copolymer HDPE of the first layer and the homopolymer HDPE of the second layer, wherein the third layer is disposed between the first layer and the second layer, wherein a total weight content of the homopolymer HDPE is at least about 30 wt-% of the body wall.

Reference will now be made in detail to embodiments of the disclosed subject matter, examples of which are illustrated in the accompanying drawings. The disclosed subject matter will be described in conjunction with the detailed description of the composition, article formed of such composition, and method of making the same. The present disclosure relates to multilayer polymer compositions including copolymer HDPE and homopolymer HDPE, which can be formed into multilayer polymer structures and articles, e.g., by thermoforming or blow molding or the like.

Although reference will be made herein to articles that are containers for food, beverages, and consumer products, other similar suitable articles are contemplated.

As used herein, the term "about" means within an acceptable range or tolerance for the particular value as determined by a person of ordinary skill in the art, which will depend in part on how the value is measured or determined, such as the limitations of the measurement system.

Figure 1:
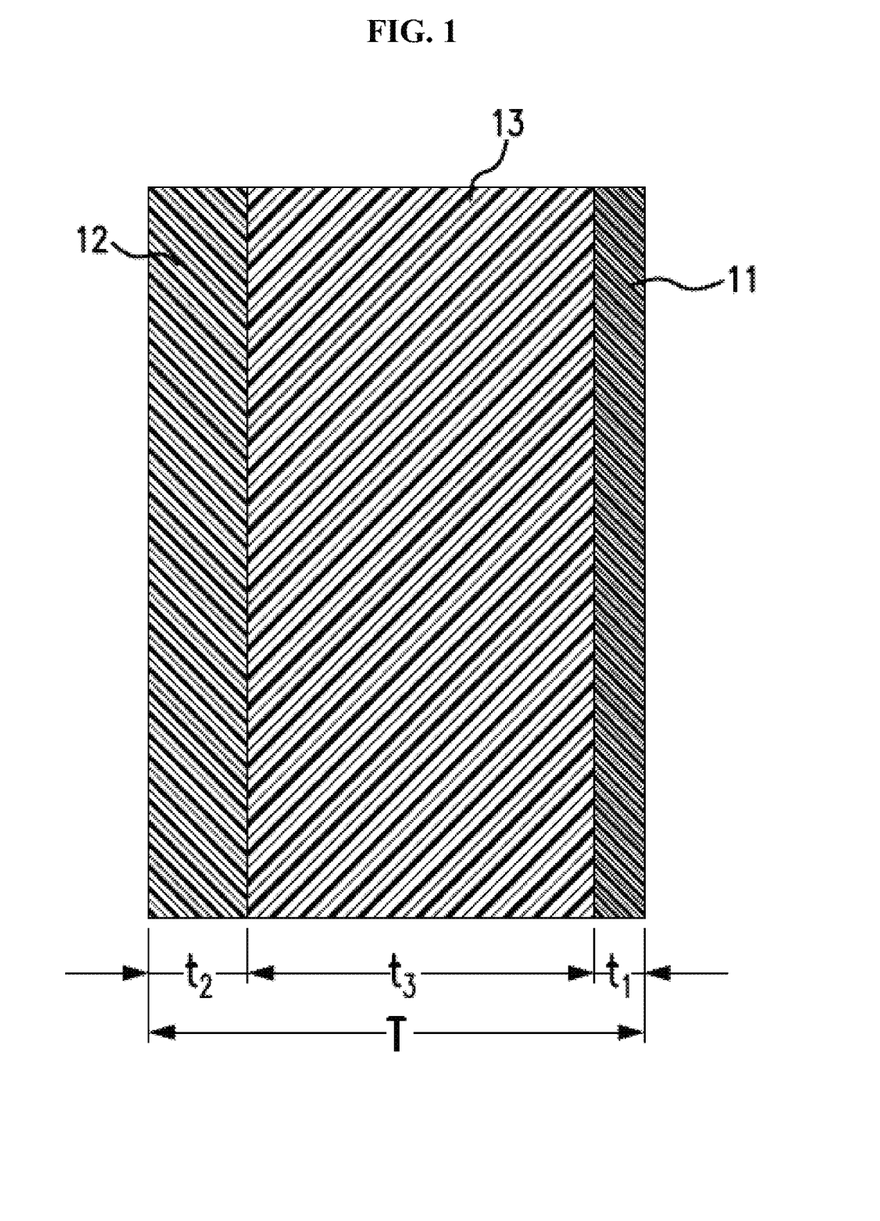
FIG. 1 is a schematic cross-section view of a multilayer polymer structure of the disclosed subject matter.

For purpose of explanation and illustration, and not limitation, an exemplary embodiment of a multilayer polymer structure 10 that can be formed into an article in accordance with the present disclosure is shown in FIG. 1. Particularly, FIG. 1 illustrates a cross-sectional view of a multilayer polymer structure that comprises the composition in accordance with the present disclosure. For example, and for purposes of illustration and not limitation, FIG. 1 illustrates an enlarged cross-sectional view of the multilayer polymer structure, such as a sheet or a preform, used to form the articles of the present disclosure using conventional molding techniques, such as thermoforming or blow molding techniques.

As embodied and as depicted in FIG. 1, the composition of the multilayer polymer structure 10 comprises a first layer 11, a second layer 12, and a third layer 13 disposed between the first layer 11 and the second layer 12. The first layer 11 comprises copolymer HDPE. For example, the first layer can comprise copolymer HDPE formed from ethylene and other alpha olefins. For the purpose of example and not limitation, suitable alpha olefins include butene, hexene, and octene. The second layer 12 comprises homopolymer HDPE formed from ethylene monomers. The third layer 13 comprises a mix including the copolymer HDPE of the first layer and the homopolymer HDPE of the second layer. For example, the third layer 13 can comprise a regrind of excess material trimmings from a blow-molding system, including the material from the first layer, and material from the second layer. Furthermore, and an additional amount of the copolymer HDPE can be added to the mixture, as described further below. In addition, the regrind can include a PCR and an additional amount of the copolymer HDPE.

As embodied herein, one or more of the first layer 11, the second layer 12, and the third layer 13 can further comprise other suitable additives, as known by a person of ordinary skill in the art. For example, and not limitation, such additives include colorants, pigments, lubricants, plasticizers, stabilizers, fire retardants, fibers, processing aids, or other additives, e.g., additives to assist in the processing and manufacture of the polymer compositions of the layers and finished article. For further example, suitable additives can include other suitable or desired compounds that can be dispersed within the polymer compositions of the layers without significantly changing the molecular structure of the polymeric matrix of the layers. For example, and as embodied herein, the second layer can include a colorant or pigment. The colorant or pigment can be selected to provide an aesthetically pleasing appearance to an article formed from the composition of the second layer, e.g., by masking the color of the polymer. Any suitable amount of colorant or pigment can be used, if provided.

In accordance with the present disclosure, and as noted above, the multilayer polymer composition disclosed herein can be formed as a multilayer polymer structure having a body portion having a body wall with an overall wall thickness T as illustrated in FIG. 1. The first layer 11 can have a first thickness t1 of at least about 10% of the overall wall thickness T, preferably about 10% of the overall wall thickness T. The second layer 12 can have a second thickness t2 of at least about 15% of the overall wall thickness T, preferably about 15% or 20% of the overall wall thickness T. The third layer 13 can have a third thickness t3 equivalent to the balance of the overall wall thickness (i.e., t3=T−t1−t2). For example, the third thickness t3 can be at least about 70% of the overall wall thickness T, such as about 70% or 75% of the overall wall thickness T. As embodied herein and as illustrated by examples below, the first layer 11 can have a first thickness t1 of about 10% of the overall wall thickness T, the second layer 12 can have a second thickness t2 of about 20% of the overall wall thickness T, and the third layer 13 can have a third thickness t3 of about 70% of the overall wall thickness T. In accordance with another embodiment of the present disclosure, the first layer 11 can have a first thickness t1 of about 10% of the overall wall thickness T, the second layer 12 can have a second thickness t2 of about 15% of the overall wall thickness T, and the third layer 13 can have a third thickness t3 of about 75% of the overall wall thickness T.

In accordance with a further aspect of the present disclosure, a total weight content of the homopolymer HDPE in the multilayer polymer structure is at least about 30 wt-% of the body wall, such as about 30 wt-% of the body wall, about 40 wt-% of the body wall, or about 50 wt-% of the body wall.

For purpose of illustration and not limitation, reference will be made to a few exemplary embodiments of a multilayer composition in accordance with the disclosed subject matter. As described further below, exemplary articles and containers were formed with these compositions to demonstrate the corresponding and advantageous performance.

For example and as embodied herein, a multilayer composition in accordance with the disclosed subject matter is provided with a first layer of copolymer HDPE, a second layer of homopolymer HDPE, and a total weight content of the homopolymer HDPE of about 30 wt-% of the body wall, wherein a third layer comprises about 47.6 wt-% regrind, about 23.8 wt-% post-consumer resin (PCR), and about 28.6 wt-% copolymer HDPE, and the regrind comprises a mix of the first layer and the second layer, and an additional amount of about 30 wt-% homopolymer HDPE and an additional amount of about 25 wt-% PCR. As embodied herein, for illustration and not limitation, the first layer 11 has a first thickness t1 of about 10% of the overall wall thickness T, the second layer 12 has a second thickness t2 of about 20% of the overall wall thickness T, and the third layer 13 has a third thickness t3 of about 70% of the overall wall thickness T.

In accordance with another embodiment of the disclosed subject matter, a multilayer composition in accordance with the disclosed subject matter is provided with a first layer of copolymer HDPE, a second layer of homopolymer HDPE, and a total weight content of the homopolymer HDPE of about 40 wt-% of the body wall, wherein a third layer comprises about 71.4 wt-% regrind, about 17.9 wt-% post-consumer resin (PCR), and about 10.7 wt-% copolymer HDPE, and the regrind comprises a mix of the first layer and the second layer, and an additional amount of about 40 wt-% homopolymer HDPE and an additional amount of about 25 wt-% PCR. As embodied herein, for illustration and not limitation, the first layer 11 has a first thickness t1 of about 10% of the overall wall thickness T, the second layer 12 has a second thickness t2 of about 20% of the overall wall thickness T, and the third layer 13 has a third thickness t3 of about 70% of the overall wall thickness T.

In accordance with another exemplary embodiment of the disclosed subject matter, a multilayer composition in accordance with the disclosed subject matter is provided with a first layer of copolymer HDPE, a second layer of homopolymer HDPE, and a total weight content of the homopolymer HDPE of about 50 wt-% of the body wall, wherein a third layer comprises about 85.7 wt-% regrind and about 14.3 wt-% post-consumer resin (PCR), and the regrind comprises a mix of the first layer and the second layer, and an additional amount of about 50 wt-% homopolymer HDPE and an additional amount of about 25 wt-% PCR. As embodied herein, for illustration and not limitation, the first layer 11 has a first thickness t1 of about 10% of the overall wall thickness T, the second layer 12 has a second thickness t2 of about 20% of the overall wall thickness T, and the third layer 13 has a third thickness t3 of about 70% of the overall wall thickness T.

Further to the multilayer composition and structure set forth above, another aspect of the present disclosure includes a molded article formed from the multilayer polymer structure. That is, the multilayer composition can be molded using conventional molding techniques, such as thermoforming or blow molding techniques, to form an article having a body wall. For example, but not limitation, the article of the present disclosure can be formed as a container to contain a food, beverage, or consumer product placed therein, wherein the body wall defines a compartment and includes an inner surface and an outer surface. In this manner, a molded multilayer polymer container can comprise a body portion having a body wall defining a compartment, the body wall having an inner surface and an outer surface, the body wall including a first layer disposed proximate the inner surface and comprising a copolymer high-density polyethylene (HDPE), a second layer disposed proximate the outer surface and comprising a homopolymer HDPE, and a third layer disposed between the first layer and the second layer, the third layer comprising a mix of the copolymer HDPE of the first layer and the homopolymer HDPE of the second layer, wherein a total weight content of the homopolymer HDPE is at least about 30 wt-% of the body wall.

Figure 2:
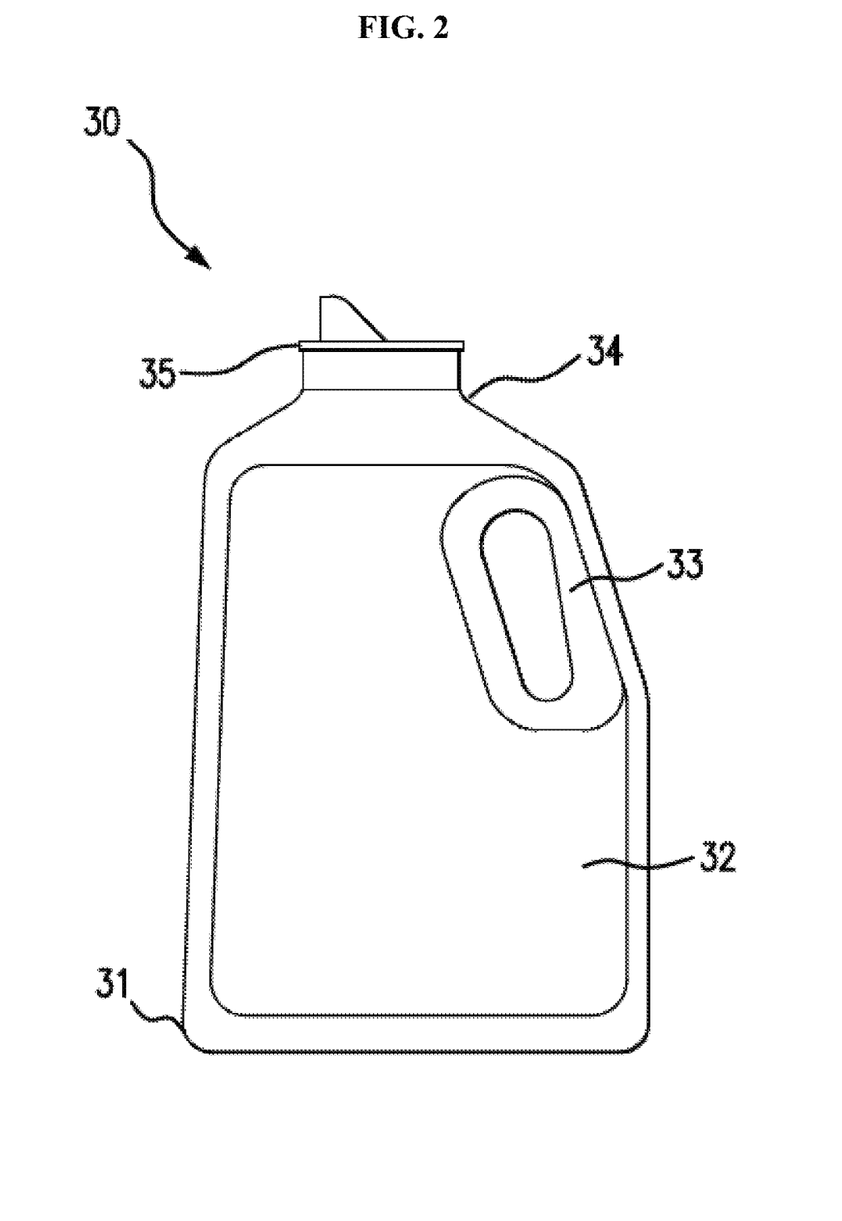
FIG. 2 is a side view of an exemplary laundry detergent container in accordance with the disclosed subject matter.

For purposes of illustration and not limitation, reference is made to a container such as a 112 fl oz laundry detergent container 30 as depicted in FIG. 2. The exemplary article embodied herein generally has a base 31, a body wall 32 extending from the base, a handle 33, a neck 34, a bottle neck finish area 35, and a thread (not shown). The article of the present invention can be any conventional or suitable container, including but not limited to, cups, bowls, trays, plates, bottles, jugs and other suitable shapes. FIG. 2 illustrates a representative embodiment of a 112 fl oz laundry detergent container of the present disclosure. It shall be understood that the embodiment of FIG. 2 is representative for illustration only and that modifications and changes can be made without departing from the spirit or scope of the present disclosure.

Referring to FIGS. 1 and 2 by way of example only, the body wall of a container formed from the multilayer polymer composition and structure will generally define a compartment and have an "outer" surface and an "inner" surface. Each surface generally is exposed to different types of wear. For example, the inner surface is typically exposed to or may be in direct contact with the food, beverage, or other consumer product contained therein, such as a laundry detergent. The outer surface is opposite the inner surface and is typically exposed to the environment and may be in direct contact with various external structures such as a counter, shelf, packaging machinery or an individual. With reference to the multilayer polymer structure of the present disclosure, the first layer 11 of the multilayer polymer structure preferably is aligned to define the inner surface of the article. In this manner, the inner surface will provide the article with desirable ESCR properties from the copolymer HDPE therein. The first layer 11 can also be formed or molded to define an engaging surface along a rolled lip, a flange or the like, the first layer including a sealant layer disposed adjacent thereto for engagement with a lid, sealing film or lidding film. In accordance with an embodiment of the present disclosure, the second layer 12 of the multilayer polymer structure constitutes the outer surface of the article of the present disclosure. In this manner, the outer surface will provide the article with desirable mechanical strength and stiffness, such as a desirable topload and mean drop failure height. In addition, if color or enhanced aesthetics are desired, a colorant or the like can be added to the second layer to impart a vivid color to the exterior of the article.

As embodied herein and in accordance with another aspect of the invention, the molded multilayer polymer structure and container embodied herein can be formed by conventional extrusion blow molding methods and systems. That is, such articles of the present disclosure can be formed from a multilayer polymer structure which has been extruded and then blow molded using a continuous inline process described in further detail herein. As embodied herein, the number of extruders at the extrusion station of an extrusion blow molding system will depend on the ultimate number and composition of layers of thermoplastic. Typically, one extruder is used for each layer having a different composition. For example, the molded multilayer polymer container embodied herein may be formed by a 12-station rotary wheel blow molding system with a separate extruder for co-extrusion of each of the first layer 11, the second layer 12, and the third layer 13. For example and not limitation, the molded multilayer polymer structure and container of the disclosed subject matter may be formed by the continuous extrusion wheel-type system disclosed in U.S. Pat. No. 7,153,127, which is incorporated herein by reference. Additional extruders can be provided if additional layers are desired. While certain extruders can be configured to extrude a single material such as the first layer or the second layer, other extruders can be configured to mix additional components for extrusion, such as the third layer. That is, the third extruder can receive ground scrap from the first layer and second layer, as well as incorporate additional components, such as PCR, additional copolymer HDPE, and additional homopolymer HDPE.

The use of discrete multilayers comprising homopolymer HDPE, copolymer HDPE, or a mix of both homopolymer HDPE and copolymer HDPE, as embodied herein can provide various advantages over the use of conventional materials that are primarily composed of virgin resins. For example, the molded multilayer polymer structure or container as embodied herein can provide, in a cost-efficient manner, a combination of both desirable mechanical properties (i.e., topload and mean drop failure height) and desirable ESCR properties by combining the properties of copolymer HDPE and homopolymer HDPE without sacrificing either. In addition, the molded multilayer polymer structure or container as embodied herein can also provide a reduced weight for additional economic advantages in shipping and handling. Furthermore, because the regrind can be sourced from processing trimmings and the PCR can be sourced from post-consumer recycled material, the molded multilayer polymer structure or container can provide a further economic advantage over conventional materials that are primarily composed of virgin resins.

EXAMPLES

The presently disclosed subject matter will be better understood by reference to the following Examples. These Examples are merely illustrative of the presently disclosed subject matter and should not be considered as limiting the scope of the subject matter in any way.

Example 1: Mechanical Strength (i.e., Topload and Mean Drop Failure Height) of the Molded Multilayer Polymer Container This Example demonstrates the effect of the disclosed homopolymer HDPE and copolymer HDPE compositions on the mechanical strength of a molded multilayer polymer container.

Figure 3:
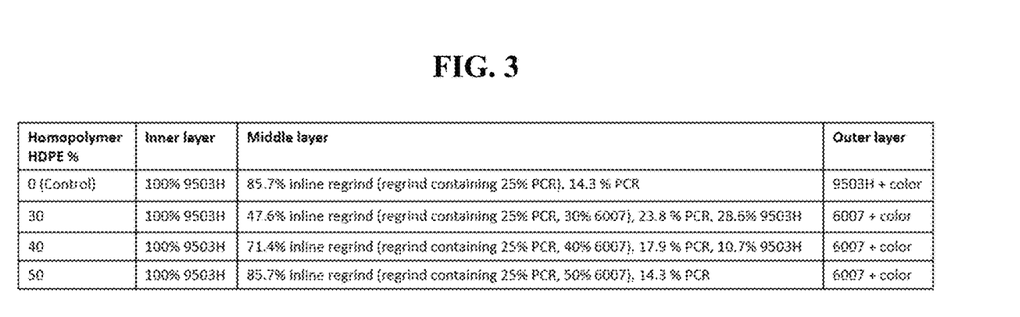
FIG. 3 is a table showing compositions of exemplary containers formed in accordance with the disclosed subject matter.
Figure 4:
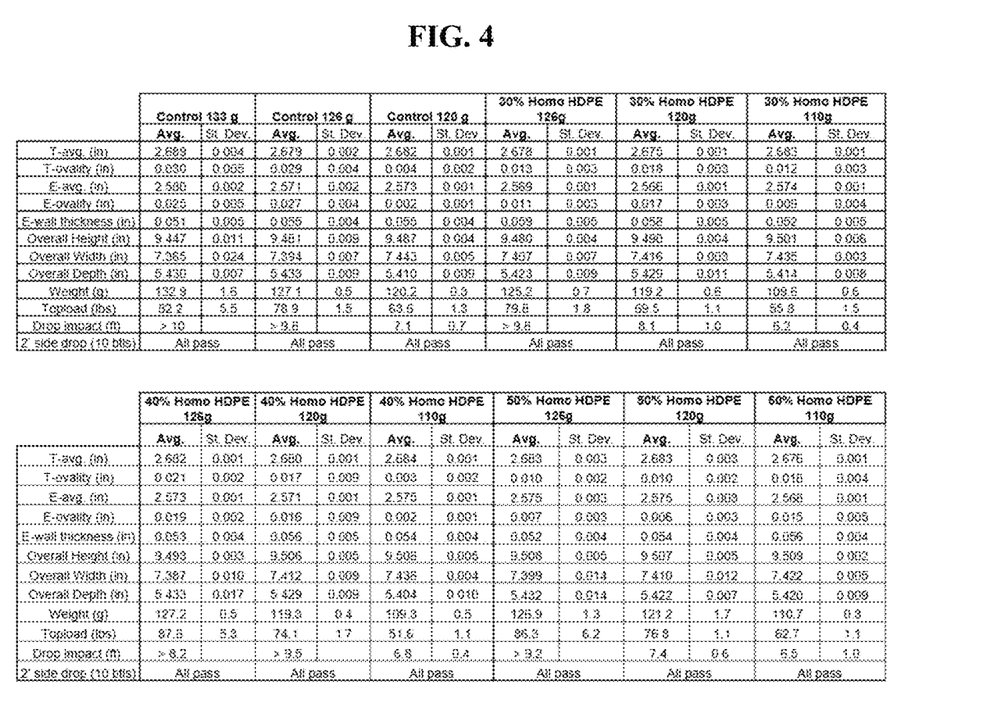
FIG. 4 is a table showing various measured properties and dimensions, including mechanical strength and drop impact, of control and test containers formed in accordance with the disclosed subject matter.

With reference to FIGS. 3 and 4, control containers weighing 133 g, 126 g and 120 g, respectively, and having a volume of 112 fl oz, were prepared. The control containers comprised a first layer comprising 9503H copolymer HDPE, a second layer comprising 9503H copolymer HDPE and colorant, and a third layer disposed between the first layer and the second layer comprising 85.7% regrind and 14.3% PCR, with the regrind comprising 25% PCR. The control containers had an overall wall thickness T, with the first layer having a first thickness of about 10% of the overall wall thickness T, the second layer having a second thickness of about 20% of the overall wall thickness T, and the third layer having a third thickness of about 70% of the overall wall thickness T.

In addition, with reference to FIGS. 3 and 4, three sets of test containers were prepared. Each of the first set, the second set, and the third set of test containers included containers having a total weight content of homopolymer HDPE of about 30 wt-%, about 40 wt-%, and about 50 wt-%, respectively, and having a volume of 112 fl oz.

The test containers in the first set comprising a total weight content of homopolymer HDPE of about 30 wt-% included a first layer comprising 9503H copolymer HDPE, a second layer comprising 6007 homopolymer HDPE and colorant, and a third layer disposed between the first layer and the second layer comprising 47.6 wt-% regrind, 23.8 wt-% PCR and 28.6 wt-% 9503H copolymer HDPE, with the regrind containing additional 25 wt-% PCR and additional 30 wt-% 6007 homopolymer HDPE. The containers from this first set included containers weighing 126 g, 120 g, and 110 g. In addition, each of the containers in the first set had an overall wall thickness T, with the first layer having a first thickness of about 10% of the overall wall thickness T, the second layer having a second thickness of about 20% of the overall wall thickness T, and the third layer having a third thickness of about 70% of the overall wall thickness T.

The test containers in the second set comprising a total weight content of homopolymer HDPE of about 40 wt-% included a first layer comprising 9503H copolymer HDPE, a second layer comprising 6007 homopolymer HDPE and colorant, and a third layer disposed between the first layer and the second layer comprising 71.4 wt-% regrind, 17.9 wt-% PCR and 10.7 wt-% 9503H copolymer HDPE, with the regrind containing additional 25 wt-% PCR and additional 40 wt-% 6007 homopolymer HDPE. The containers from this second set included containers weighing 126 g, 120 g, and 110 g. In addition, each of the containers in the second set had an overall wall thickness T, with the first layer having a first thickness of about 10% of the overall wall thickness T, the second layer having a second thickness of about 20% of the overall wall thickness T, and the third layer having a third thickness of about 70% of the overall wall thickness T.

The test containers in the third set comprising a total weight content of homopolymer HDPE of about 50 wt-% included a first layer comprising 9503H copolymer HDPE, a second layer comprising 6007 homopolymer HDPE and colorant, and a third layer disposed between the first layer and the second layer comprising 85.7 wt-% regrind and 14.3 wt-% PCR, with the regrind containing additional 25 wt-% PCR and additional 50 wt-% 6007 homopolymer HDPE. The containers from this third set included containers weighing 126 g, 120 g, and 110 g. In addition, each of the containers in the third set had an overall wall thickness T, with the first layer having a first thickness of about 10% of the overall wall thickness T, the second layer having a second thickness of about 20% of the overall wall thickness T, and the third layer having a third thickness of about 70% of the overall wall thickness T.

Each of the control containers and test containers described above were produced by a conventional extrusion blow molding process using a 12-station rotary wheel blow molding system with three co-extruders.

Fifteen containers of each type of control container and each type of test container described above were analyzed to measure weights and dimensions and tested to determine topload values. In addition, twenty containers of each type of control container and each type of test container described above were tested to determine drop impact values. Furthermore, ten containers of each type of control container and each type of test container described above were tested to determine side drop (i.e., 2' side drop) values. FIG. 4 shows the average dimensions, weights, and test results for the control containers and test containers analyzed. With reference to FIG. 4, "T-avg." denotes the average of the outside diameters of the thread of each container in parallel and perpendicular directions to the parting line of each container; "T-ovality" denotes the difference between the outside diameters of the thread of each container at parallel and perpendicular directions to the parting line of each container; "E-avg." denotes the average of the outside diameters of the neck of each container at parallel and perpendicular directions to the parting line of each container; "E-ovality" denotes the difference between the outside diameters of the neck of each container at parallel and perpendicular directions to the parting line of each container; "E-wall thickness" denotes the thickness of the bottle neck finish area of each container; "Topload" denotes the maximum weight that can be placed on top of each container before the container exhibits yield; "Drop impact" denotes the drop impact value of each container as measured by the procedure described in ASTM D2463 "Standard Test Method for Drop Impact Resistance of Blow-Molded Thermoplastic Containers," incorporated in its entirety by reference herein; "2' side drop" denotes whether or not each container exhibited any cracking when dropped on its side from a height of two feet.

As shown in FIG. 4, the test results demonstrate that the test containers formed in accordance with the disclosed subject matter possess improved mechanical strength and stiffness as evidenced by the measured topload, mean drop failure height ("Drop impact"), and 2' side drop results for each test container weighing 126 g and 120 g in comparison with the corresponding control containers weighing 126 g and 120 g, respectively. Furthermore, the test results also demonstrate that the mechanical strength and stiffness properties of the test containers can be maintained at practical and operational levels while reducing the weight of the containers.

Figure 5:
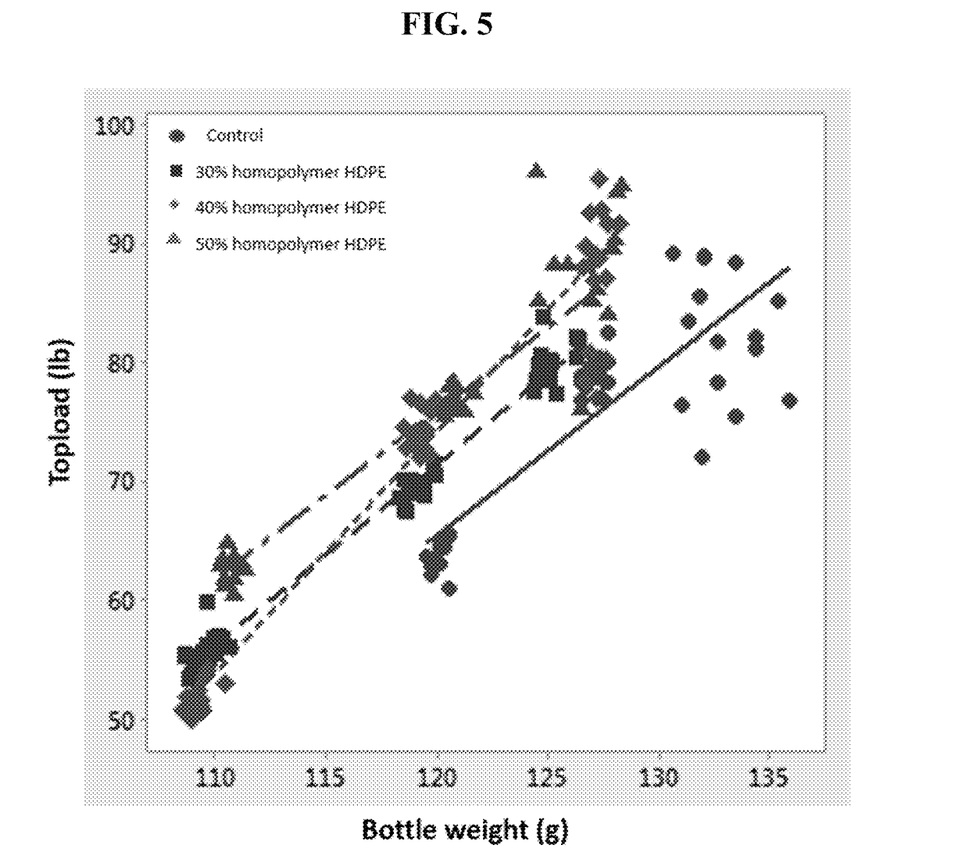
FIG. 5 is a graph showing statistical regressions of topload vs. bottle weight for containers formed in accordance with the disclosed subject matter.

FIG. 5 shows a graph indicating statistical regressions of topload vs. bottle weight for the tested test containers. The graph indicates that topload properties were improved for the test containers at the same gram weight as the control containers. In addition, the graph indicates that the weight of the test containers could be reduced while maintaining comparable toploads as the control containers.

Example 2: ESCR Properties of the Molded Multilayer Polymer Container

This Example demonstrates the maintenance of functional ESCR properties in molded multilayer polymer containers comprising reduced copolymer HDPE as disclosed in the present subject matter.

Ten 133 g control containers and ten 126 g control containers were prepared as disclosed in Example 1. In addition, a first set of ten 110 g test containers each comprising a total weight content of homopolymer HDPE of about 50 wt-% homopolymer were prepared as disclosed in Example 1. Each container in the first set had a body wall with an overall wall thickness T, a first layer having a first thickness of about 10% of the overall wall thickness, a second layer having a second thickness of about 20% of the overall wall thickness, and a third layer having a third thickness of about 70% of the overall wall thickness T. Furthermore, a second set of ten 110 g test containers each comprising a total weight content of homopolymer HDPE of about 50 wt-% were prepared. Each container in the second set had a body wall with an overall wall thickness T, a first layer having a first thickness of about 5% of the overall wall thickness, a second layer having a second thickness of about 20% of the overall wall thickness, and a third layer having a third thickness of about 75% of the overall wall thickness T. All of the control and test containers had a volume of 112 fl oz.

Each of the control containers and test containers was filled to one third of its volume with 10% IGEPAL CA-630, a non-ionic, non-denaturing surfactant, and then placed in a chamber maintained at 140° F. Each of the test containers maintained functional ESCR properties and did not exhibit any leaking or visible crack initiation on the inner surface, i.e., the first layer, under these conditions for at least one week.

As demonstrated by this Example, a molded multilayer polymer container can maintain functional ESCR properties even when the copolymer HDPE composition is reduced and replaced with up to a total weight content of homopolymer HDPE of at least about 50 wt-%, as long as the contact layer (i.e., the first layer) comprises a material having high ESCR (e.g., copolymer HDPE) and has a thickness of at least 5% of the overall wall thickness of the container.

While the disclosed subject matter is described herein in terms of certain preferred embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to a molded multilayer polymer container throughout this disclosure, other suitable articles likewise can be manufactured using the multilayer polymer compositions and methods disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the compositions and methods of the disclosed subject matter without departing from the spirit or scope of the disclosed subject matter. Thus, it is intended that the disclosed subject matter include modifications and variations that are within the scope of the appended claims and their equivalents.

What is claimed is:

1. A molded multilayer polymer structure comprising:
a body portion having a body wall, the body wall including:
a first layer comprising a copolymer high-density polyethylene (HDPE);
a second layer comprising a homopolymer HDPE; and
a third layer comprising a mix of the copolymer HDPE of the first layer and the homopolymer HDPE of the second layer, wherein the third layer is disposed between the first layer and the second layer,
wherein a total weight content of the homopolymer HDPE is at least about 30 wt-% of the body wall.

2. The multilayer polymer structure of claim 1, wherein the second layer further comprises a colorant.

3. The molded multilayer polymer structure of claim 1, wherein the third layer includes a regrind comprising the first layer and the second layer.

4. The molded multilayer polymer structure of claim 3, wherein the regrind further includes a post-consumer resin (PCR).

5. The molded multilayer polymer structure of claim 4, wherein the regrind further includes an additional amount of the homopolymer HDPE.

6. The molded multilayer polymer structure of claim 5, wherein the third layer further includes an additional amount of the copolymer HDPE.

7. The molded multilayer polymer structure of claim 1, wherein the body wall has an overall wall thickness T, the first layer has a first thickness of at least about 10% of the overall wall thickness T, and the second layer has a second thickness of at least about 15% of the overall wall thickness T.

8. The molded multilayer polymer structure of claim 7, wherein the first thickness is about 10% of the overall wall thickness T, the second thickness is about 20% of the overall wall thickness T, and the third layer has a third thickness of about 70% of the overall wall thickness T.

9. The molded multilayer polymer structure of claim 1, wherein a total weight content of the homopolymer HDPE is about 30 wt-% of the body wall.

10. The molded multilayer polymer structure of claim 9, wherein the third layer comprises about 47.6 wt-% regrind, about 23.8 wt-% post-consumer resin (PCR), and about 28.6 wt-% copolymer HDPE, and
wherein the regrind comprises a mix of the first layer and the second layer, and an additional amount of about 30 wt-% homopolymer HDPE and an additional amount of about 25 wt-% PCR based on the total weight of the regrind.

11. The molded multilayer polymer structure of claim 1, wherein a total weight content of the homopolymer HDPE is about 40 wt-% of the body wall.

12. The molded multilayer polymer structure of claim 11, wherein the third layer comprises about 71.4 wt-% regrind, about 17.9 wt-% post-consumer resin (PCR), and about 10.7 wt-% copolymer HDPE, and
wherein the regrind comprises a mix of the first layer and the second layer, and an additional amount of about 40 wt-% homopolymer HDPE and an additional amount of about 25 wt-% PCR based on the total weight of the regrind.

13. The molded multilayer polymer structure of claim 1, wherein a total weight content of the homopolymer HDPE is about 50 wt-% of the body wall.

14. The molded multilayer polymer structure of claim 13, wherein the third layer comprises about 85.7 wt-% regrind and about 14.3 wt-% post-consumer resin (PCR), and
wherein the regrind comprises a mix of the first layer and the second layer, and an additional amount of about 50 wt-% homopolymer HDPE and an additional amount of about 25 wt-% PCR based on the total weight of the regrind.

15. The molded multilayer polymer structure of claim 13 wherein the body wall has an overall wall thickness T, the first layer has a first thickness of about 5% of the overall wall thickness T, the second layer has a second thickness of about 20% of the overall wall thickness T, and the third layer has a third thickness of about 75% of the overall wall thickness T.

16. The molded multilayer polymer structure of claim 1, wherein the copolymer HDPE comprises ethylene and at least one other alpha olefin.

17. The molded multilayer polymer structure of claim 16, wherein the at least one other alpha olefin is selected from butene, hexene, and octene.

18. A molded multilayer polymer container comprising:
a body portion having a body wall defining a compartment, the body wall having an inner surface and an outer surface, the body wall including:
a first layer disposed proximate the inner surface and comprising a copolymer high-density polyethylene (HDPE);
a second layer disposed proximate the outer surface and comprising a homopolymer HDPE; and
a third layer disposed between the first layer and the second layer, the third layer comprising a mix of the copolymer HDPE of the first layer and the homopolymer HDPE of the second layer,
wherein a total weight content of the homopolymer HDPE is at least about 30 wt-% of the body wall.

19. The molded multilayer polymer container of claim 18, wherein the second layer further comprises a colorant.

20. The molded multilayer polymer container of claim 18, wherein the third layer includes a regrind comprising the first layer and the second layer.

21. The molded multilayer polymer container of claim 20, wherein the regrind further includes a post-consumer resin (PCR).

22. The molded multilayer polymer container of claim 21, wherein the regrind further includes an additional amount of the homopolymer HDPE.

23. The molded multilayer polymer container of claim 22, wherein the third layer further includes an additional amount of the copolymer HDPE.

24. The molded multilayer polymer container of claim 18, wherein the body wall has an overall wall thickness T, the first layer has a first thickness of at least about 10% of the overall wall thickness T, and the second layer has a second thickness of at least about 15% of the overall wall thickness T.

25. The molded multilayer polymer container of claim 24, wherein the first thickness is about 10% of the overall wall thickness T, the second thickness is about 20% of the overall wall thickness T, and the third layer has a third thickness of about 70% of the overall wall thickness T.

26. The molded multilayer polymer container of claim 18, wherein a total weight content of the homopolymer HDPE is about 30 wt-% of the body wall.

27. The molded multilayer polymer container of claim 26, wherein the third layer comprises about 47.6 wt-% regrind, about 23.8 wt-% post-consumer resin (PCR), and about 28.6 wt-% copolymer HDPE, and
wherein the regrind comprises a mix of the first layer and the second layer, and an additional amount of about 30 wt-% homopolymer HDPE and an additional amount of about 25 wt-% PCR based on the total weight of the regrind.

28. The molded multilayer polymer container of claim 18, wherein a total weight content of the homopolymer HDPE is about 40 wt-% of the body wall.

29. The molded multilayer polymer container of claim 28, wherein the third layer comprises about 71.4 wt-% regrind, about 17.9 wt-% post-consumer resin (PCR), and about 10.7 wt-% copolymer HDPE, and
wherein the regrind comprises a mix of the first layer and the second layer, and an additional amount of about 40 wt-% homopolymer HDPE and an additional amount of about 25 wt-% PCR based on the total weight of the regrind.

30. The molded multilayer polymer container of claim 18, wherein a total weight content of the homopolymer HDPE is about 50 wt-% of the body wall.

31. The molded multilayer polymer container of claim 30, wherein the third layer comprises about 85.7 wt-% regrind and about 14.3 wt-% post-consumer resin (PCR), and
wherein the regrind comprises a mix of the first layer and the second layer, and an additional amount of about 50 wt-% homopolymer HDPE and an additional amount of about 25 wt-% PCR based on the total weight of the regrind.

32. The molded multilayer polymer container of claim 30, wherein the body wall has an overall wall thickness T, the first layer has a first thickness of about 5% of the overall wall thickness T, the second layer has a second thickness of about 20% of the overall wall thickness T, and the third layer has a third thickness of about 75% of the overall wall thickness T.

33. The molded multilayer polymer container of claim 18, wherein the copolymer HDPE comprises ethylene and at least one other alpha olefin.

34. The molded multilayer polymer container of claim 33, wherein the at least one other alpha olefin is selected from butene, hexene, and octene.

35. A molded multilayer polymer structure comprising:
a body portion having a body wall, the body wall consisting essentially of:
a first layer comprising a copolymer high-density polyethylene (HDPE);
a second layer comprising a homopolymer HDPE; and
a third layer comprising a mix of the copolymer HDPE of the first layer and the homopolymer HDPE of the second layer, wherein the third layer is disposed between the first layer and the second layer,
wherein a total weight content of the homopolymer HDPE is at least about 30 wt-% of the body wall.

36. The molded multilayer polymer structure of claim 35, the body wall further consisting essentially of one or more additives.

37. The molded multilayer polymer structure of claim 36, wherein the one or more additives is selected from the group consisting of colorants, pigments, lubricants, plasticizers, stabilizers, fire retardants, fibers, and processing aids.

38. A molded multilayer polymer container comprising:
a body portion having a body wall defining a compartment, the body wall having an inner surface and an outer surface, the body wall consisting essentially of:
a first layer disposed proximate the inner surface and comprising a copolymer high-density polyethylene (HDPE);
a second layer disposed proximate the outer surface and comprising a homopolymer HDPE; and
a third layer disposed between the first layer and the second layer, the third layer comprising a mix of the copolymer HDPE of the first layer and the homopolymer HDPE of the second layer,
wherein a total weight content of the homopolymer HDPE is at least about 30 wt-% of the body wall.

39. The molded multilayer polymer container of claim 38, the body wall further consisting essentially of one or more additives.

40. The molded multilayer polymer container of claim 39, wherein the one or more additives is selected from the group consisting of colorants, pigments, lubricants, plasticizers, stabilizers, fire retardants, fibers, and processing aids.

* * * * *